June 10, 1958 S. P. DI MATTIA ET AL 2,838,073
SURGE PRESSURE ABSORBER
Filed Sept. 1, 1953 2 Sheets-Sheet 1

Inventors
Samuel P. DiMattia
John N. Bruce
By
Attorney

June 10, 1958  S. P. DI MATTIA ET AL  2,838,073
SURGE PRESSURE ABSORBER
Filed Sept. 1, 1953  2 Sheets-Sheet 2

Inventors
Samuel P. DiMattia
John N. Bruce
By George Renehan
Attorney

United States Patent Office 2,838,073
Patented June 10, 1958

2,838,073

SURGE PRESSURE ABSORBER

Samuel P. Di Mattia, New Castle, Del., and
John N. Bruce, Bel Air, Md.

Application September 1, 1953, Serial No. 377,987

1 Claim. (Cl. 138—30)

(Granted under Title 35, U. S. Code (1952), sec. 266)

The invention described herein may be manufactured and used by or for the Government of the United States of America for governmental purposes without the payment to us of any royalty thereon.

This invention relates to a surge pressure absorber which is adapted to absorb or reduce the surge pressure or "liquid hammer" caused by the stoppage of the flow of liquid.

An object of our invention is to provide a surge pressure absorber which will offer a minimum of resistance to the flow of fluid therethrough.

A more specific object of our invention is to provide a surge pressure absorber which is adapted to handle highly viscous liquids under high pressures flowing at high velocities.

A still more specific object of our invention is to provide a surge pressure absorber which is suitable for use in an extension hose of a military flame thrower of the type employing jellied gasoline as a fuel.

A further object of our invention is to provide a surge pressure absorber which is simple in construction and light in weight.

A further object of certain embodiments of our invention is to provide a surge pressure absorber which is flexible.

In the accompanying drawings.

Figure 1:
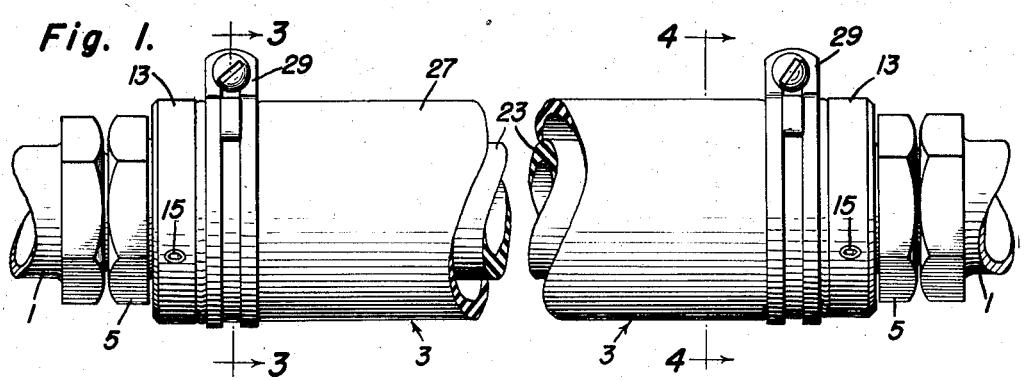
Figure 1 is an elevation of one embodiment of our invention with part broken away to show interior construction.
Figure 2:
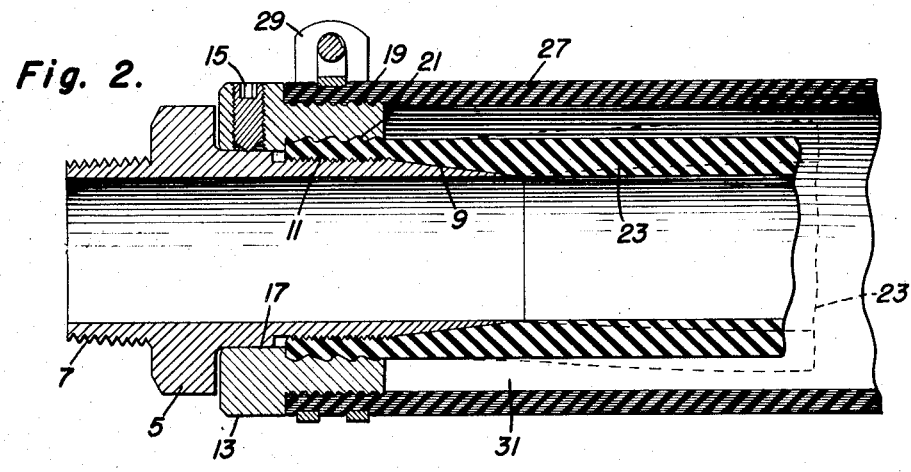
Figure 2 is a longitudinal section of one end of the embodiment shown in Figure 1.
Figure 3:
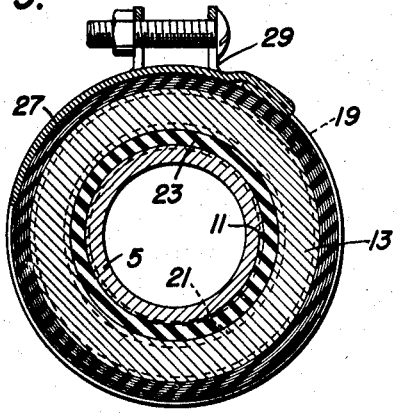
Figure 3 is a transverse section taken on line 3—3 of Figure 1.
Figure 4:
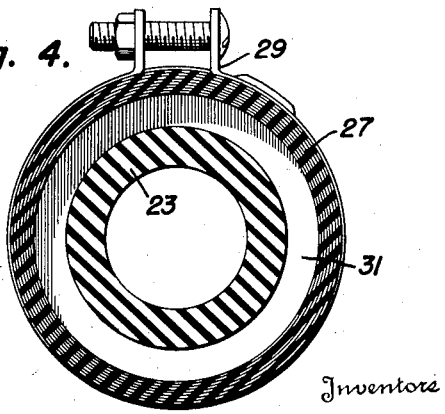
Figure 4 is a transverse section taken on line 4—4 of Figure 1.

When the flow of liquid in a long pipe or other conduit is suddenly arrested the kinetic energy of the moving mass of liquid gives rise to high momentary increases in pressures and sets up compressional waves in the column of liquid. Various means have been proposed to provide a cushion for the fluid which will lessen the rate of deceleration of the liquid and hence the force imposed on the conduit, or damp the compressional waves. It is to this class of device that our invention relates.

Basically, it comprises two concentric tubes of differing diameter, the ends of which are connected in such a manner as to provide a sealed air space between the tubes. The inner tube is made of an elastic, expansible material, such as non-reinforced rubber. The outer tube is formed of relatively strong material having substantially fixed dimensions. In one embodiment of our invention the outer tube is made of metal. In another embodiment particularly adapted to be used in connection with a flexible conduit, such as a fire hose, or the extension hose of a flame thrower gun the outer tube is made of a flexible but gas tight material such as reinforced rubber or impregnated fabric. When the outer tube is made of metal, we find it desirable to further provide, within the expansible tube, a metal tubular member having the same inside diameter as the pipe or other conduit to which the device is connected. We also provide means for introducing gas under pressure into the space between the tube and to balance the normal pressure existing in the line.

Flame throwers of the type employing jellied gasoline fuel presented particularly difficult problems due to surge pressures. Normal operating pressures are extremely high, being of the order of several hundred pounds per square inch, velocities are high and the flow is suddenly interrupted. The peculiar physical properties of the jellied gasoline make it imperative to avoid obstructions to or deflection of the flow. It is also necessary to keep the weight to a minimum and to employ a structure which can readily be disassembled for replacement or repair of parts. Commercial surge chambers available at the time this invention was made were not adaptable to this use because of failure to meet the requirements set out above.

The specific embodiments of our invention will now be described.

In Figures 1 through 4 we have shown an embodiment in which the device is so constructed as to be flexible. In this embodiment 1, 1 indicates the hose or other conduit in which the surge pressure absorber is mounted. At each end of the absorber is a sleeve 5 provided with pipe threads 7. The inner end of sleeve 5 is tapered as shown at 9. Adjacent this tapered portion is a threaded section 11.

Surrounding each sleeve 5 is a clamping ring 13. This ring is held in place by set screws 15 which engage an exterior surface 17 of sleeve 5. The parts are proportioned to give a sliding fit between members 5 and 13. Ring 13 is cut away to provide an exterior recessed annular surface 19 and an internal recessed annular surface 21, which are provided with gripping corrugations. A tube 23 of heavy but non-reinforced resilient rubber, preferably gasoline-resistant synthetic rubber, is gripped by rings 13 and screw threads 11 of sleeve 5. As will be apparent from Figure 2, the rubber is considerably compressed to provide a strong connection. A hose 27 of reinforced rubber is clamped on outer recessed surfaces 19 of rings 13 by means of hose clamps 29 of conventional construction. A tightly sealed dead air space 31 is formed between tube 23 and hose 27.

The inside diameters of sleeve 5 and tube 23 are the same as that of the line in which the absorber is to be mounted. When connected into the discharge end of a liquid line the surge absorber becomes an integral part of the liquid line and does not interrupt the direction of flow of liquid. Further, due to the absence of obstructions of any kind, no turbulence is introduced and the velocity of flow is unaffected until a flow stoppage is made by valve closure. Upon such closure, the kinetic energy of the liquid causes tube 23 to expand into dead air space 31 compressing the air therein as shown in dotted lines in Figure 2. This causes a more gradual deceleration of the liquid than would otherwise occur, thus lowering the surge pressures and minimizing the production of compressional waves in the liquid. The outer hose also serves to limit the expansion of the inner tube and to provide the unit with additional strength and protection.

This embodiment of the absorber is made relatively long. For example with an inside diameter of 1½ inches, the overall length may be about five feet and the radial depth of the dead air space about ⅜ inch. Such a unit is highly flexible and may be connected with any hose without interfering with the normal handling thereof.

Figure 5:
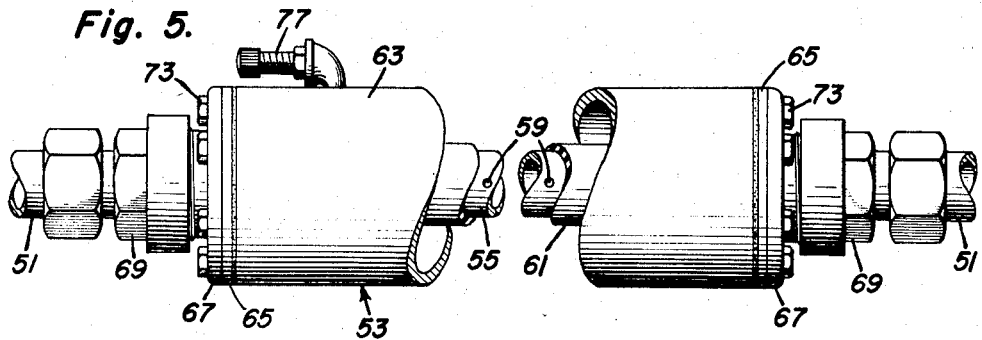
Figure 5 is a view similar to Figure 1 of a second embodiment of our invention.
Figure 6:
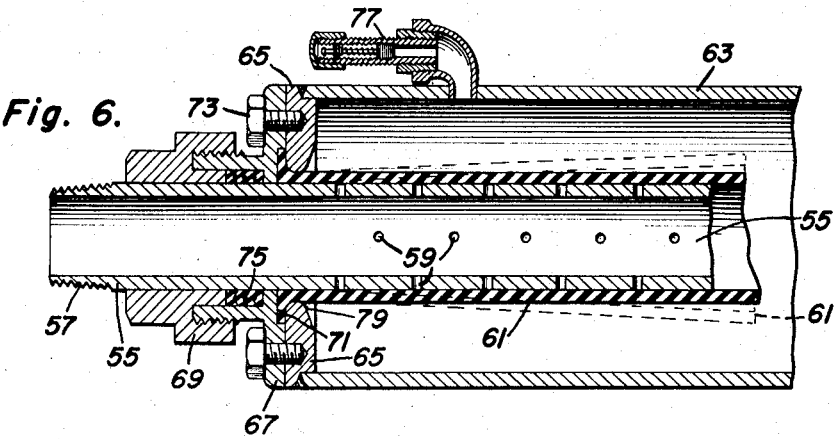
Figure 6 is a longitudinal section of one end of the embodiment shown in Figure 5.

In Figures 5 and 6 we have shown another embodiment of our invention for use in those situations where a rigid structure may be employed. The pipe or other conduit in which the absorber is mounted is indicated by numeral 51 and the absorber as a whole by 53. The absorber comprises a central metal tubular member 55 provided with pipe threads 57 at its ends. The central portion of the tubular member is provided with a considerable number of perforations 59. Surrounding this central tubular member is a tube 61 of resilient, non-reinforced, preferably gasoline resistant rubber. Outside the tubular members is a metal housing comprising a cylinder 63 having end walls 65 welded thereto.

The elements previously described are held in a gas and liquid tight relationship by means of flanges 67 and nuts 69. The face of each flange is cut away at 71 to receive an end of rubber tube 61. Each flange is secured to an end wall of the housing by cap screws 73, thus compressing each end of rubber tube 61 between the tubular member 55, endwall 65 and flange 67. Nut 69 compresses packing 75 against flange 67 and tubular member 55.

In this embodiment I provide means for introducing air or other gas under pressure into the housing. For this purpose a conventional self closing tank valve 77 is attached to the cylinder 63. Any type valve capable of maintaining pressures of the magnitude required may be employed. Ordinarily an initial gas pressure approximating the normal working pressure in pipe or conduit 51 will be employed. The inner diameter of the rubber tube 61 is substantially the same as the external diameter of tubular member 55. Hence, the rubber tube is maintained in an unstressed condition except during the surge periods. Endwalls 65 are rounded at their inner edges 79 to further minimize stresses on the rubber.

The operation of this embodiment is quite similar to that of the form previously described. Tubular member 55 simply constitutes a portion of the conduit 51 under normal conditions. Upon closing of a valve, the liquid flows through perforations 59, expanding tube 61 against the gas pressure within the housing as shown in dotted lines in Figure 6. This reduces surge presures in a manner already described. Due to the initial gas pressure, this form may be made smaller than the flexible type previously described. For example when used on a ¾ inch line handling jellied gasoline under a working pressure of three hundred pounds per square inch, a housing approximately twelve inches long and three inches in diameter has been employed. In a typical installation the surge pressure produced by valve closure when no absorber was used was about 1000 pounds per square inch. With the absorber just described, the surge pressure was reduced to about 450 pounds per square inch.

Figure 7:
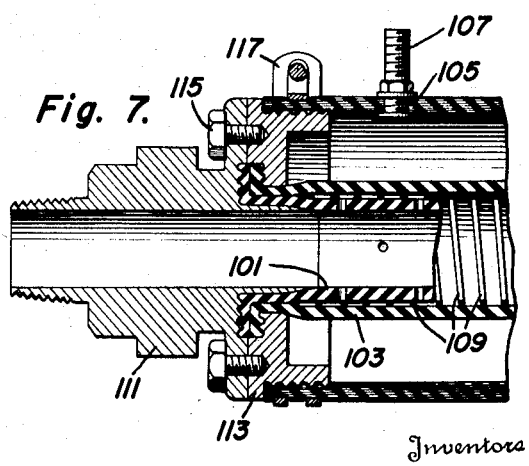
Figure 7 is a longitudinal section of one end of a third embodiment of our invention.

A third embodiment of our invention, shown in Figure 7, includes certain advantages of each of the other two forms. It is flexible, but also is of a structure which permits the application of initial gas pressure to the exterior of the expansible rubber tube without the danger of collapsing that tube so as to shut off the flow channel should the liquid pressure drop below its normal value.

In this modification two flexible tubes 101 and 103 are provided. The inner tubular member 101 is perforated in the same manner and for the same purpose as tubular member 55 of Figures 5 and 6. This tubular member may be made of either reinforced or non-reinforced rubber. The outer tube 103 is made of non-reinforced rubber and constitutes an expansible member similar to the corresponding tube of each of the other modifications. A reinforced hose 105 forms the outer wall of the absorber and may be provided with a conventional self closing valve 107.

Between tubes 101 and 103 we provide a spring stiffener 109. While we have shown the tubes as separated throughout most of their length by the thickness of the spring wires, it will be understood that under high pressures in tubular member 101 and outside of tube 103, the tubes will be pressed together between the wires, providing mutual support. The structure is completed by flanged sleeve 111, wall member 113, cap screws 115 and hose clamp 117 at each end of the device which join the elements previously described in a manner which will be apparent from the drawing.

The operation of this embodiment is the same as that of Figures 5 and 6. Because of the tube structure the absorber possesses a high degree of flexibility, though somewhat less than the modification of Figures 1–4.

While we have given numerous details of construction it will be realized that they are merely exemplary and that numerous variations are possible. We, therefore, do not wish our invention to be limited except by the scope of the appended claim.

We claim:

A surge pressure absorber comprising a rigid tubular member of uniform cross section having a smooth unobstructed bore, said tubular member having a central perforate section and imperforate end sections; a housing comprising a cylinder provided with end walls positioned substantially at right angles to the axis thereof, each said end wall having a substantially flat outer face and having a circular central opening of a diameter slightly greater than the external diameter of said tubular member; a flange at each end of said housing comprising a radially inner portion in contact with the periphery of said tube, a threaded sleeve portion surrounding and concentric with said tubular member and joined to said radially inner portion and a flat face portion contacting the outer face of said end wall, said face portion being cut away adjacent said tubular member; packing material between said sleeve portion and said tubular member; a tube formed of resilient non-reinforced rubber having an internal diameter substantially equal to the external diameter of said tubular member and surrounding said tubular member, each of the ends of said tube being bent outwardly to lie between said face of an end member and the cut away portion of the face portion of a flange; screw means for forcing said face portion of each flange against the outer face of the adjacent end member and a nut engaging said threaded portion of each flange and said packing material, whereby the ends of the tube and the packing material are compressed, thus forming a substantially gas tight chamber within said housing and surrounding said tube; means to introduce and maintain gas under pressure within said chamber; the imperforate ends of said tubular member extending beyond said housing and being provided with coupling means adapted to couple said tubular member to a flow line.

References Cited in the file of this patent

UNITED STATES PATENTS

| 398,111 | Abbott et al. | Feb. 19, 1889 |
| 628,222 | Hewit | July 4, 1899 |
| 2,290,337 | Knauth | July 21, 1942 |
| 2,495,693 | Byrd et al. | Jan. 31, 1950 |
| 2,532,143 | Breit | Nov. 28, 1950 |
| 2,609,001 | Hebard | Sept. 2, 1952 |
| 2,712,831 | Day | July 12, 1955 |

FOREIGN PATENTS

| 881,694 | France | Feb. 4, 1943 |